(12) United States Patent
Kim

(10) Patent No.: US 9,184,823 B2
(45) Date of Patent: Nov. 10, 2015

(54) ENCODING APPARATUS AND ENCODING METHOD OF MULTIPLE INPUT MULTIPLE OUTPUT COMMUNICATION SYSTEM

(71) Applicant: Electronics and Telecommunications Research Institute, Daejeon (KR)

(72) Inventor: Byung Jo Kim, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/157,727

(22) Filed: Jan. 17, 2014

(65) Prior Publication Data

US 2015/0030093 A1  Jan. 29, 2015

(30) Foreign Application Priority Data

Jul. 26, 2013 (KR) ........................ 10-2013-0089089

(51) Int. Cl.
*H04B 7/02* (2006.01)
*H04L 1/02* (2006.01)
*H04B 7/06* (2006.01)
*H04B 7/04* (2006.01)

(52) U.S. Cl.
CPC ............ *H04B 7/0689* (2013.01); *H04B 7/0456* (2013.01); *H04B 7/0697* (2013.01)

(58) Field of Classification Search
CPC ... H04B 7/0689; H04B 7/0456; H04B 7/0697
USPC ........................................................ 375/267
See application file for complete search history.

(56) References Cited

U.S. PATENT DOCUMENTS

| 8,208,576 | B2 | 6/2012 | Ihm et al. | |
|---|---|---|---|---|
| 8,213,530 | B2 | 7/2012 | Lee et al. | |
| 8,284,849 | B2 | 10/2012 | Lee et al. | |
| 8,284,865 | B2 | 10/2012 | Lee et al. | |
| 8,331,464 | B2 | 12/2012 | Lee et al. | |
| 2008/0232503 | A1* | 9/2008 | Kim | 375/267 |
| 2010/0074316 | A1* | 3/2010 | Kim et al. | 375/228 |
| 2011/0075758 | A1* | 3/2011 | Nam et al. | 375/295 |
| 2012/0269248 | A1* | 10/2012 | Lee et al. | 375/224 |
| 2013/0114752 | A1* | 5/2013 | Murakami et al. | 375/267 |
| 2013/0121431 | A1* | 5/2013 | Sun et al. | 375/267 |

FOREIGN PATENT DOCUMENTS

| KR | 1020070114099 A | 11/2007 |
|---|---|---|
| KR | 101100116 B1 | 12/2011 |

* cited by examiner

*Primary Examiner* — Nader Bolourchi
(74) *Attorney, Agent, or Firm* — William Park & Associates Ltd.

(57) ABSTRACT

When precoding information corresponding to data items of respective layers to be transmitted is received from an upper layer, an encoding apparatus of a multiple input multiple output (MIMO) communication system selects a precoding matrix among a plurality of precoding matrices stored in a storage using the precoding information and precodes the data items of the respective layers by simple operations consisting of at least one operation combination of addition, subtraction, selection, and inversion operations in accordance with a kind of the selected precoding matrix and a precoding operation pattern.

16 Claims, 3 Drawing Sheets

ENCODING APPARATUS AND ENCODING METHOD OF MULTIPLE INPUT MULTIPLE OUTPUT COMMUNICATION SYSTEM

CROSS-REFERENCE TO RELATED APPLICATION

This application claims priority to and the benefit of Korean Patent Application No. 10-2013-0089089 filed in the Korean Intellectual Property Office on Jul. 26, 2013, the entire contents of which are incorporated herein by reference.

BACKGROUND OF THE INVENTION (a) Field of the Invention

The present invention relates to an encoding apparatus and an encoding method of a multiple input multiple output (MIMO) communication system. More particularly, the present invention relates to an encoding apparatus and an encoding method that may be applied to multiple input multiple output (MIMO) communication systems with different numbers of antennas.

(b) Description of the Related Art

In a multiple input multiple output (MIMO) technology, transmitting and receiving efficiency of data is improved by using multiple transmitting antennas and multiple receiving antennas.

The MIMO technology may be divided into a spatial multiplexing technique and a spatial diversity (SD) technique in accordance with a data transmission method. In the spatial multiplexing technique, different data items are simultaneously transmitted from a transmitter to a receiver using the multiple transmitting antennas so that data may be transmitted at a higher speed without increasing bandwidth of a system. On the other hand, in the SD technique, the same data is transmitted by the transmitter using the multiple transmitting antennas to obtain transmission diversity.

In addition, the MIMO technology may be divided into an open loop method and a closed loop method in accordance with whether channel information is fed back from the receiver to the transmitter or not. In the open loop method, data is transmitted by the transmitter without the channel information being fed back from the receiver. On the other hand, in the closed loop method, the data is transmitted by the transmitter with the channel information being fed back from the receiver. In the open loop method, amounts of calculations are smaller than those in the closed loop method, however a diversity gain, a data rate, and a decoding complexity are contrary to each other.

A MIMO communication system is applied to various long term evolution (LTE) and wireless local area network (WLAN) standards. In the MIMO communication system, an encoder of the transmitter selects an optimal precoding matrix using the channel information fed back from the receiver, and combines the precoding matrix with data items of respective layers in order to transmit the data items to the multiple transmitting antennas. When the number of channel environments and antennas varies, an encoder suitable for the number of channel environments and antennas is required. Therefore, in a state where the numbers of channel environments and antennas are different from each other in various standards, new encoders must be designed.

SUMMARY OF THE INVENTION

A technical object of the present invention is to provide an encoding apparatus and an encoding method that may be applied although numbers of channel environments and antennas are different from each other.

According to an exemplary embodiment of the present invention, an encoding apparatus of a multiple input multiple output (MIMO) communication system is provided. The encoding apparatus includes a storage, a controller, an operation selector, and an operator. The storage stores a plurality of precoding matrices to correspond to a plurality of address values, respectively. The controller receives precoding information corresponding to data items of respective layers from an upper layer, selects a precoding matrix from the storage using the precoding information, and analyzes a kind of the selected precoding matrix and a precoding operation pattern. The operation selector selects one of spatial multiplexing precoding, spatial multiplexing simple precoding, and transmission diversity precoding in accordance with the kind of the precoding matrix and the precoding operation pattern. The operator precodes the data items of the respective layers in accordance with the selected precoding.

The operator may include a spatial multiplexing operator for multiplying the selected precoding matrix and the data items of the respective layers to perform spatial multiplexing precoding, a spatial multiplexing simple operator for performing simple operations consisting of at least one operation combination of addition, subtraction, selection, and inversion operations on the data items of the respective layers to perform spatial multiplexing simple precoding, and a transmission diversity operator for performing transmission diversity precoding on the selected precoding matrix and the data items of the respective layers.

The operation selector may select spatial multiplexing simple precoding when the selected precoding matrix is a spatial multiplexing precoding matrix and it is determined from the precoding operation pattern that precoding may be performed by the simple operations.

The controller may determine whether precoding may be performed by the simple operations from the precoding operation pattern.

The controller may determine that precoding may be performed by the simple operations when the selected precoding matrix consists of at least one of 0, 1, and −1.

The operation selector may select spatial multiplexing precoding when the selected precoding matrix is a spatial multiplexing precoding matrix and it is determined from the precoding operation pattern that the precoding may not be performed by the simple operations.

The operation selector may select transmission diversity precoding when the selected precoding matrix is a transmission diversity precoding matrix.

The controller may convert variable values applied to calculations of the plurality of precoding matrices into the plurality of address values, and may store the plurality of precoding matrices in the storage to correspond to the plurality of address values.

The variable values may include at least one of the numbers of transmitting antennas, transmission modes, numbers of layers, channel information, and codebook indices.

According to another exemplary embodiment of the present invention, an encoding method of an encoding apparatus of a MIMO communication system is provided. The encoding method includes receiving precoding information corresponding to data items of respective layers to be transmitted from an upper layer, selecting a precoding matrix among a plurality of precoding matrices stored in a storage using the precoding information, selecting one of spatial multiplexing precoding, spatial multiplexing simple precoding, and transmission diversity precoding in accordance with a kind of the selected precoding matrix and a precoding operation pattern, and precoding the data items of the respective layers in accordance with the selected precoding.

The encoding method may further include converting variable values applied to calculations of the plurality of precoding matrices into the plurality of address values, and storing the plurality of precoding matrices in the storage to correspond to the plurality of address values.

The variable values may include at least one of the numbers of transmitting antennas, transmission modes, numbers of layers, channel information, and codebook indices.

Selecting one of spatial multiplexing precoding, spatial multiplexing simple precoding, and transmission diversity precoding in accordance with a kind of the selected precoding matrix and a precoding operation pattern may include selecting spatial multiplexing simple precoding when the selected precoding matrix is a spatial multiplexing precoding matrix and it is determined that precoding may be performed by simple operations consisting of at least one operation combination of addition, subtraction, selection, and inversion operations in the selected precoding matrix. Precoding the data items of the respective layers in accordance with the selected precoding may include performing the simple operations on the data items of the respective layers to precode the data items of the respective layers.

Selecting the spatial multiplexing simple precoding may include determining that precoding may be performed by the simple operations when the selected precoding matrix consists of at least one of 0, 1, and −1.

Selecting one of spatial multiplexing precoding, spatial multiplexing simple precoding, and transmission diversity precoding in accordance with a kind of the selected precoding matrix and a precoding operation pattern may include selecting spatial multiplexing precoding when the selected precoding matrix is a spatial multiplexing precoding matrix and it is determined that precoding may be performed by multiplication operations in the selected precoding matrix. Precoding the data items of the respective layers in accordance with the selected precoding may include multiplexing the data items of the respective layers and the selected precoding matrix to precode the data items of the respective layers.

Selecting one of spatial multiplexing precoding, spatial multiplexing simple precoding, and transmission diversity precoding in accordance with a kind of the selected precoding matrix and a precoding operation pattern may include selecting transmission diversity precoding when the selected precoding matrix is a transmission diversity precoding matrix. Precoding the data items of the respective layers in accordance with the selected precoding may include multiplexing the data items of the respective layers and the selected precoding matrix to precode the data items of the respective layers.

DETAILED DESCRIPTION OF THE EMBODIMENTS

Figure 1:
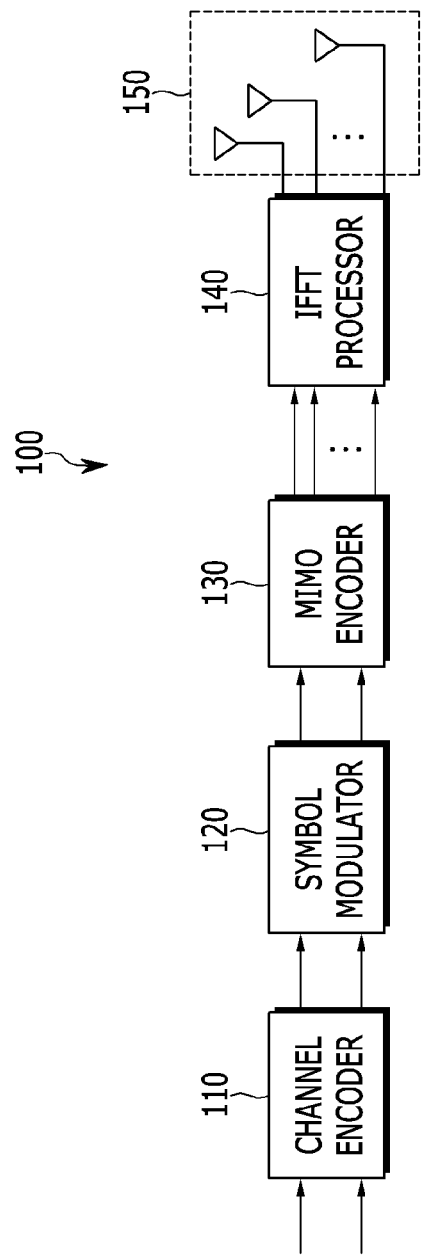
FIG. 1 is a view illustrating an example of a transmitting apparatus of a multiple input multiple output (MIMO) communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification and claims, unless explicitly described to the contrary, the word "comprise" and variations such as "comprises" or "comprising" will be understood to imply the inclusion of stated elements but not the exclusion of any other elements.

Hereinafter, an encoding apparatus and an encoding method of a multiple input multiple output (MIMO) communication system according to an exemplary embodiment of the present invention will be described in detail with reference to the accompanying drawings.

FIG. 1 is a view illustrating an example of a transmitting apparatus of a MIMO communication system according to an exemplary embodiment of the present invention.

Referring to FIG. 1, a transmitting apparatus 100 of a MIMO communication system, for example, a MIMO-orthogonal frequency division multiplexing (OFDM) system using an OFDM method, includes a channel encoder 110, a symbol modulator 120, a MIMO encoder 130, and an inverse fast Fourier transform (IFFT) processor 140, and a plurality of transmitting antennas 150.

The channel encoder 110 channel encodes input bit streams of respective layers, and outputs the channel encoded data of the respective layers to the symbol modulator 120. A channel encoding method includes convolution encoding, turbo encoding, and low-density parity-check (LDPC) encoding.

The symbol modulator 120 symbol-maps the channel encoded data of the respective layers through digital modulation such as binary phase shift keying (BPSK), quadrature amplitude modulation (QAM), 16-QAM, and 64-QAM to output the symbol mapped data to the MIMO encoder 130.

The MIMO encoder 130 MIMO encodes data symbols of the respective layers that are output from the symbol modulator 120. MIMO encoding means processing the data symbols by a previously appointed method in transmitting the data symbols through the plurality of transmitting antennas 150 in order to increase capacity, throughput, and coverage of the MIMO communication system.

The MIMO encoder 130 selects a precoding matrix and precodes the data symbols of the respective layers using the selected precoding matrix to output the precoded data symbols to the IFFT processor 140. In the precoding matrix, the number of rows is equal to the number of transmitting antennas and the number of columns is equal to the number of layers.

The IFFT processor 140 performs IFFT on the precoded data symbols to transmit the data symbols on which the IFFT is performed through the corresponding transmitting antennas 150. The IFFT is a process of modulating the data symbols using a plurality of carriers to convert a frequency domain signal into a time domain signal.

Figure 2:
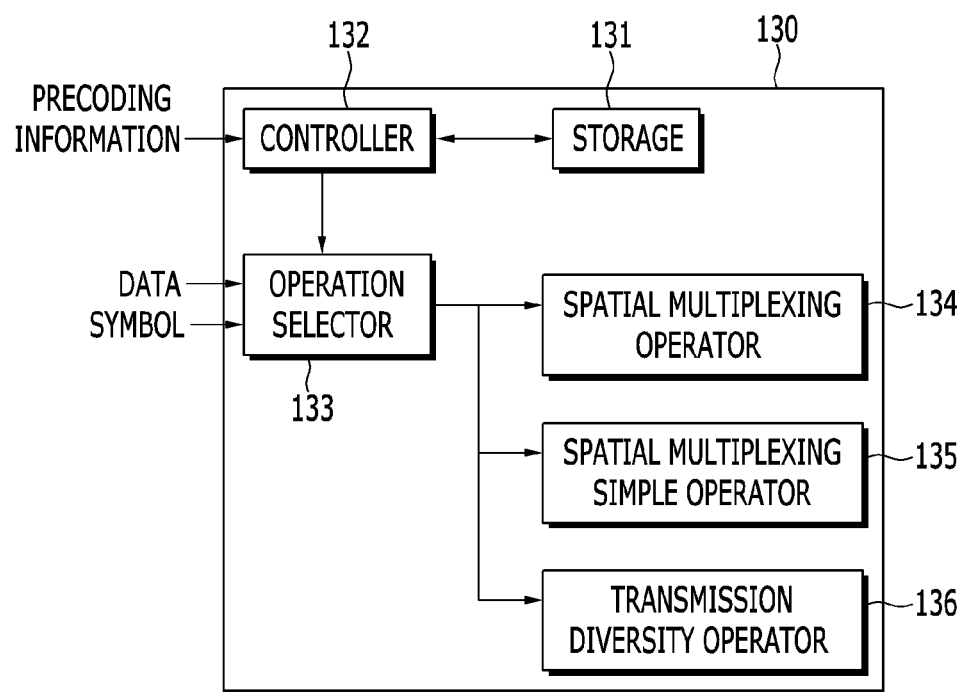
FIG. 2 is a view illustrating a MIMO encoder according to an exemplary embodiment of the present invention.

FIG. 2 is a view illustrating a MIMO encoder according to an exemplary embodiment of the present invention.

Referring to FIG. 2, the MIMO encoder 130 includes a storage 131, a controller 132, an operation selector 133, a spatial multiplexing operator 134, a spatial multiplexing simple operator 135, and a transmission diversity operator 136.

The storage 131 stores the precoding matrix. The precoding matrix may be divided into a diversity precoding matrix and a spatial multiplexing precoding matrix in accordance with a transmission method. The diversity precoding matrix is a precoding matrix that may be operated to provide transmission diversity, and the spatial multiplexing precoding matrix is a precoding matrix that may be operated to provide spatial multiplexing. In addition, the spatial multiplexing precoding matrix may be divided into a closed loop method and an open loop method. Precoding matrices of the respective methods are previously calculated, and the previously calculated precoding matrices are stored in the storage 131 through the controller 132. The storage 131 may vary in accordance with a realizing method such as a read only memory (ROM), a random access memory (RAM), and a register.

Table 1 and Table 2 illustrate spatial multiplexing precoding matrices of a closed loop method in a long term evolution (LTE) system.

TABLE 1

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 2, u represents a generating vector defined in a standard of the LTE system for generating a 4*4 householder matrix. That is, 16 generating vectors are defined in accordance with codebook indices, precoding matrices $W_n$ (n= 0, . . . , 15) are generated in accordance with equations of Table 2, and precoding matrix coefficients are generated in Table 2 using columns of the respective precoding matrices $W_n$ in accordance with the number of layers. After the generated precoding matrix coefficients are stored in addresses of corresponding storages, the generated precoding matrix coefficients are used for precoder operations.

The precoding matrices of Table 1 and Table 2 may be stored in the storage 131 through a storage interface.

The controller 132 may map the previously calculated precoding matrices to corresponding address values to store the mapped precoding matrices in the storage 131. At this time, the address values are obtained by converting at least one of information such as the numbers of antennas, transmission modes, the numbers of layers, channel information, and codebook numbers that are applied to the calculated precoding matrices. That is, the controller 132 converts at least one of the information such as the numbers of antennas, the transmission modes, the numbers of layers, the channel information, and the codebook numbers that are applied to the calculated precoding matrices into the address values, and stores the corresponding precoding matrices in the storage 131 to correspond to the converted address values. For example, when the number of antennas is 4 and a transmission mode is closed loop transmission, since $C_4=16$ codebooks and $L_4=4$ layers exist, $N \geq \log_1(16*4)$ precoding matrices are required. At this time, the controller 132 may determine bit numbers of the address values as $N \geq \log_1(18*4)$, that is, five bits, to change the address values. That is, when a codebook index is 1 and one layer is used by the transmitting apparatus 100, a coefficient value of a precoding matrix corresponding to an address value 1 (a binary numeral=00001) may be stored in the storage 131 and may be read and written.

Table 3 represents variables required for the spatial multiplexing precoding matrix.

TABLE 3

| Variable | Magnitude | Description |
|---|---|---|
| The number of codebooks | $C_n$ | $n \in A_N = \{2, 4, 8, \ldots, N\}$<br>n: the number of antennas |

TABLE 3-continued

| Variable | Magnitude | Description |
|---|---|---|
| The number of antenna combinations | K | $K = n(A_N)_n$ ( ): the number of elements of a set |
| The number of layers | $L_n$ | $L_n = n(M)$ $M = \{1, 2, \ldots, n-1, n\}$<br>n: the number of antennas |
| Transmission mode | 2 | Open loop transmission mode and closed loop transmission mode |

As described above, when the precoding matrices of the respective methods are stored, precoding may be performed without designing the MIMO encoder 130 again in states where the numbers of channel environments and antennas are different from each other in various standards. That is, when the number of antennas is increased or the number of codebooks supported by a standard is increased, precoding matrix coefficients are increased. When an interface is simply corrected by increasing magnitudes of address bit numbers of interface related signals (for example, memory interface signals) and the number (or the number of banks) of storages 131, a design of a precoding matrix may be extended.

The controller 132 receives a control signal of data to be transmitted from an upper layer, and selects an optimal precoding matrix from the storage 131 in accordance with the control signal. The control signal may include information such as the number of antennas, a transmission mode, the number of layers, channel information, and a codebook number.

The controller 132 analyzes the selected precoding matrix to grasp a precoding operation pattern and a kind of the precoding matrix, and determines whether the precoding matrix may be performed by combinations of simple operations such as addition and subtraction operations without multiplication and division operations from the precoding operation pattern.

For example, it is assumed that the number of layers is 2, the number of transmitting antennas is 4, and a spatial multiplexing precoding matrix to be operated with a 0th data symbol to a spatial multiplexing precoding matrix to be operated with a seventh data symbol are periodically changed every eight symbols. When the spatial multiplexing precoding matrix [w(0)] to be operated with the 0th data symbol to the spatial multiplexing precoding matrix [w(7)] to be operated with the seventh data symbol consist of 0, 1, and −1 as illustrated in Equation 1, the controller 132 may determine that precoding may be performed only by combinations of simple operations in the corresponding precoding matrices [w(0) to w(7)].

$$w(0) = \begin{bmatrix} 1 & 0 \\ 1 & 0 \\ 0 & 1 \\ 0 & -1 \end{bmatrix},$$

$$w(1) = \begin{bmatrix} 0 & 1 \\ 0 & 1 \\ 1 & 0 \\ -1 & 0 \end{bmatrix},$$

$$w(2) = \begin{bmatrix} 0 & 1 \\ 1 & 0 \\ 0 & -1 \\ 1 & 0 \end{bmatrix},$$

$$w(3) = \begin{bmatrix} 1 & 0 \\ 0 & 1 \\ -1 & 0 \\ 0 & 1 \end{bmatrix},$$

(Equation 1)

$$w(4) = \begin{bmatrix} 1 & 0 \\ 0 & -1 \\ 1 & 0 \\ 0 & -1 \end{bmatrix},$$

$$w(5) = \begin{bmatrix} 0 & 1 \\ -1 & 0 \\ 0 & 1 \\ 1 & 0 \end{bmatrix},$$

$$w(6) = \begin{bmatrix} 0 & 1 \\ 0 & -1 \\ -1 & 0 \\ -1 & 0 \end{bmatrix},$$

$$w(7) = \begin{bmatrix} 1 & 0 \\ -1 & 0 \\ 0 & -1 \\ 0 & -1 \end{bmatrix}$$

That is, when the precoding matrices consist of 0, 1, and −1, amounts of calculations are increased when multiplication operations are performed. In particular, in a precoding operation pattern where values of precoding matrices corresponding to respective layers are 0 and 1 or 0 and −1 as illustrated in Equation 1, since one of data symbols of the two layers is to be selected, the controller 132 may determine that precoding may be performed only by combinations of simple operations in the corresponding precoding matrices. In this case, the spatial multiplexing simple operator 135 may perform precoding only by a multiplexor for selecting one of the data symbols of the two layers and an inverter for inverting the selected symbol.

In addition, when the number of layers is 2, the number of transmitting antennas is 2, and a spatial multiplexing precoding matrix (w) is as illustrated in Equation 2, the controller 132 may determine that precoding may be performed by combinations of simple operations in the corresponding precoding matrix (w).

$$w = \begin{bmatrix} 1 & 1 \\ 1 & -1 \end{bmatrix}$$

or $$w = \begin{bmatrix} 1 & 1 \\ -1 & 1 \end{bmatrix}$$

(Equation 2)

That is, in a precoding operation pattern where values of a precoding matrix corresponding to respective layers are 1 and 1 or 1 and −1, since precoding may be performed only by addition and subtraction operations, the controller 132 may determine that precoding may be performed only by combinations of simple operations in the corresponding precoding matrix. In this case, the spatial multiplexing simple operator 135 may perform precoding only by an adder and a subtractor for adding and subtracting the data symbols of the two layers and an inverter for inverting the data symbols of the layers.

As described above, the controller 132 may analyze the values of the precoding matrix to determine whether precoding may be performed by at least one operation combination of selection, inversion, addition, and subtraction operations without relatively complex multiplication and division operations in the corresponding precoding matrix.

The controller 132 delivers an address value of the selected precoding matrix, a kind of the precoding matrix, and whether precoding may be performed by simple operations to the operation selector 133. At this time, the controller 132 may control the simple operations of the spatial multiplexing simple operator 135 with reference to the corresponding precoding matrix so that the spatial multiplexing simple operator 135 may perform precoding without the corresponding precoding matrix when it is determined that precoding may be performed by the simple operations in the corresponding precoding matrix.

The operation selector 133 selects one operator to perform precoding among the spatial multiplexing operator 134, the spatial multiplexing simple operator 135, and the transmission diversity operator 136 using the kind of the precoding matrix and whether precoding may be performed by the simple operations, and delivers the data symbols of the respective layers and the address value of the precoding matrix to the selected operator. At this time, the selected operator receives the precoding matrix corresponding to the address value from the storage 131, and precodes the data symbols of the respective layers using the precoding matrix.

The spatial multiplexing operator 134 precodes the data symbols of the respective layers using a spatial multiplexing precoding matrix. That is, the spatial multiplexing operator 134 multiplies the spatial multiplexing precoding matrix corresponding to the address value by the data symbols of the respective layers to output the multiplication results. Therefore, the spatial multiplexing operator 134 requires multiplication operations in order to perform precoding and performs precoding by operation combinations of multiplication, addition, and subtraction operations. The spatial multiplexing operator 134 may perform division operations in accordance with the spatial multiplexing precoding matrix.

The spatial multiplexing simple operator 135 precodes the data symbols of the respective layers in accordance with the simple operation control of the controller 132. At this time, the spatial multiplexing operator 134 multiplies or divides the spatial multiplexing precoding matrix and the data symbols of the respective layers. However, the spatial multiplexing simple operator 135 adds or subtracts the data symbols of the respective layers without the spatial multiplexing precoding matrix to precode the data symbols of the respective layers. As described above, when precoding is performed by the spatial multiplexing simple operator 135, precoding operation complexity may be reduced.

The transmission diversity operator 136 precodes the data symbols of the respective layers using a diversity precoding matrix.

Figure 3:
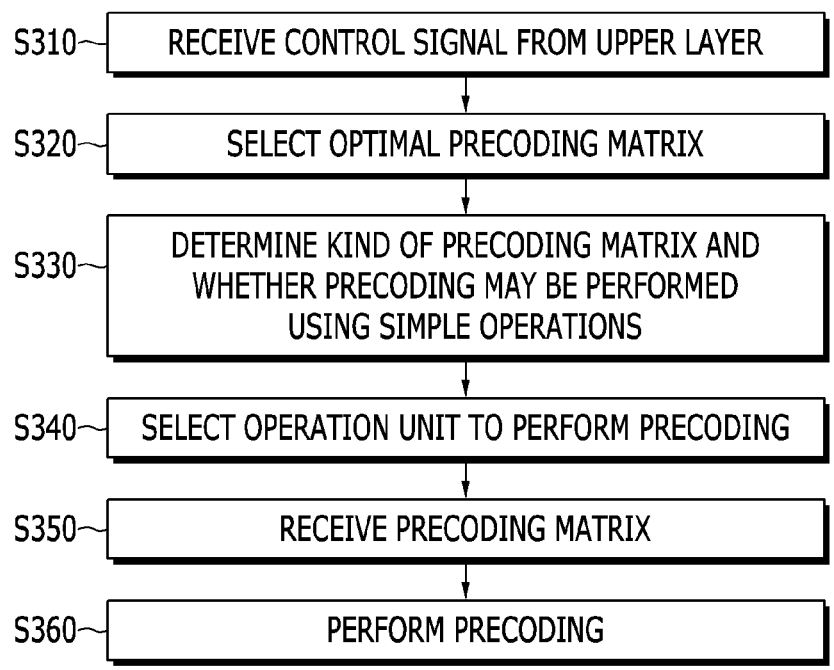
FIG. 3 is a flowchart illustrating a precoding method of a MIMO encoder according to an exemplary embodiment of the present invention.

FIG. 3 is a flowchart illustrating a precoding method of a MIMO encoder according to an exemplary embodiment of the present invention.

Referring to FIG. 3, when data items to be transmitted are generated in respective layers, an upper layer determines a transmission mode using information such as the number of transmitting antennas, the number of layers, channel information, and a codebook index, and delivers a control signal including the information on a precoding matrix such as the number of transmitting antennas, the transmission mode, the number of layers, the channel information, and the codebook index to the controller 132 of the MIMO encoder 130.

When the controller 132 receives the control signal from the upper layer (S310), a precoding matrix is selected from the storage 131 using the precoding information of the precoding matrix included in the control signal (S320). The controller 131 determines a kind of the selected precoding matrix and whether precoding may be performed by simple operations (S330).

The controller 132 delivers an address value of the precoding matrix, the kind of the precoding matrix, and whether precoding may be performed by the simple operations to the operation selector 133.

The operation selector 133 receives data symbols of the respective layers. The operation selector 133 selects one operator to perform precoding among the spatial multiplexing operator 134, the spatial multiplexing simple operator 135, and the transmission diversity operator 136 using the kind of the precoding matrix and whether precoding may be performed by the simple operations (S340), and delivers the data symbols of the respective layers and the address value of the precoding matrix to the selected operator.

The operator selected among the spatial multiplexing operator 134, the spatial multiplexing simple operator 135, and the transmission diversity operator 136 receives the precoding matrix corresponding to the address value from the storage 131 (S350) and precodes the data symbols of the respective layers using the received precoding matrix (S360).

According to the exemplary embodiment of the present invention, MIMO encoders of various standards may be supported by one encoder.

The exemplary embodiment of the present invention is not realized only by the above-described apparatus and/or method, but may also be realized by a program for realizing a function corresponding to configuration of the exemplary embodiment of the present invention and a recording medium in which the program is recorded. Such realization may be easily performed by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An encoding apparatus of a multiple input multiple output (MIMO) communication system, comprising:
   a storage for storing a plurality of precoding matrices to correspond to a plurality of address values, respectively;
   a controller for receiving precoding information corresponding to data items of respective layers from an upper layer, selecting a precoding matrix from the storage based on the precoding information, and analyzing a kind of the selected precoding matrix and a precoding operation pattern;
   wherein the upper layer determines a transmission mode using a number of transmitting antennas and a number of layers obtained from the selected precoding matrix;
   an operation selector for selecting one of spatial multiplexing precoding, spatial multiplexing simple precoding, or transmission diversity precoding in accordance with the kind of the selected precoding matrix and the precoding operation pattern; and
   an operator for precoding the data items of the respective layers in accordance with the selected precoding matrix.

2. The encoding apparatus of claim 1, wherein the operator comprises:
   a spatial multiplexing operator for multiplying the selected precoding matrix and the data items of the respective layers to perform the spatial multiplexing precoding;
   a spatial multiplexing simple operator for performing simple operations consisting of at least one operation combination of addition, subtraction, selection, and inversion operations on the data items of the respective layers to perform the spatial multiplexing simple precoding; and a transmission diversity operator for performing the transmission diversity precoding on the selected precoding matrix and the data items of the respective layers.

3. The encoding apparatus of claim 2, wherein the operation selector selects the spatial multiplexing simple precoding when the selected precoding matrix is a spatial multiplexing precoding matrix and it is determined from the precoding operation pattern that the precoding the data items may be performed by the simple operations.

4. The encoding apparatus of claim 3, wherein the controller determines whether the precoding the data items may be performed by the simple operations from the precoding operation pattern.

5. The encoding apparatus of claim 3, wherein the controller determines that the precoding the data items may be performed by the simple operations when the selected precoding matrix consists of at least one of 0, 1, or −1.

6. The encoding apparatus of claim 2, wherein the operation selector selects the spatial multiplexing precoding when the selected precoding matrix is a spatial multiplexing precoding matrix and it is determined from the precoding operation pattern that the precoding the data items may not be performed by the simple operations.

7. The encoding apparatus of claim 2, wherein the operation selector selects the transmission diversity precoding when the selected precoding matrix is a transmission diversity precoding matrix.

8. The encoding apparatus of claim 2, wherein the controller converts variable values applied to calculations of the plurality of precoding matrices into the plurality of address values, and stores the plurality of precoding matrices in the storage to correspond to the plurality of address values.

9. The encoding apparatus of claim 8, wherein the variable values comprise at least one of the number of transmitting antennas, transmission modes, numbers of layers, channel information, or codebook indices.

10. An encoding method of an encoding apparatus of a multiple input multiple output (MIMO) communication system, the encoding method comprising:

receiving precoding information corresponding to data items of respective layers to be transmitted from an upper layer;

wherein the upper layer determines a transmission mode using a number of transmitting antennas and a number of layers obtained from the selected precoding matrix;

selecting a precoding matrix among a plurality of precoding matrices stored in a storage based on the precoding information, and analyzing a kind of the selected precoding matrix and a precoding operation pattern;

selecting one of spatial multiplexing precoding, spatial multiplexing simple precoding, or transmission diversity precoding in accordance with the kind of the selected precoding matrix and the precoding operation pattern; and precoding the data items of the respective layers in accordance with the selected precoding matrix.

11. The encoding method of claim 10, further comprising:
converting variable values applied to calculations of the plurality of precoding matrices into a plurality of address values; and storing the plurality of precoding matrices in the storage to correspond to the plurality of address values.

12. The encoding method of claim 11, wherein the variable values comprise at least one of the number of transmitting antennas, the transmission modes, the numbers of layers, the channel information, or the codebook indices.

13. The encoding method of claim 11, wherein selecting the one of the spatial multiplexing precoding, the spatial multiplexing simple precoding, and the transmission diversity precoding in accordance with the kind of the selected precoding matrix and a precoding operation pattern comprises selecting the spatial multiplexing simple precoding when the selected precoding matrix is a spatial multiplexing precoding matrix and it is determined that a precoding may be performed by simple operations consisting of at least one operation combination of addition, subtraction, selection, and inversion operations in the selected precoding matrix, and precoding the data items of the respective layers in accordance with the selected precoding comprises performing the simple operations on the data items of the respective layers to precode the data items of the respective layers.

14. The encoding method of claim 13, wherein selecting the spatial multiplexing simple precoding comprises determining that precoding the data items may be performed by the simple operations when the selected precoding matrix consists of at least one of 0, 1, or −1.

15. The encoding method of claim 10, wherein selecting the one of the spatial multiplexing precoding, the spatial multiplexing simple precoding, and the transmission diversity precoding in accordance with the kind of the selected precoding matrix and a precoding operation pattern comprises selecting the spatial multiplexing precoding when the selected precoding matrix is a spatial multiplexing precoding matrix and it is determined that a precoding may be performed by multiplication operations in the selected precoding matrix, and precoding the data items of the respective layers in accordance with the selected precoding comprises multiplexing the data items of the respective layers and the selected precoding matrix to precode the data items of the respective layers.

16. The encoding method of claim 10, wherein selecting the one of the spatial multiplexing precoding, the spatial multiplexing simple precoding, and the transmission diversity precoding in accordance with the kind of the selected precoding matrix and a precoding operation pattern comprises selecting transmission diversity precoding when the selected precoding matrix is a transmission diversity precoding matrix, and precoding the data items of the respective layers in accordance with the selected precoding comprises multiplexing the data items of the respective layers and the selected precoding matrix to precode the data items of the respective layers.

* * * * *